United States Patent [19]

Min

[11] Patent Number: 5,552,923

[45] Date of Patent: Sep. 3, 1996

[54] ARRAY OF ELECTRODISPLACIVE ACTUATED MIRRORS AND METHOD FOR THE MANUFACTURE THEREOF

[75] Inventor: Yong-Ki Min, Seoul, Rep. of Korea

[73] Assignee: Daewoo Electronics Co., Ltd., Seoul, Rep. of Korea

[21] Appl. No.: 322,812

[22] Filed: Oct. 13, 1994

[30] Foreign Application Priority Data

Oct. 20, 1993 [KR] Rep. of Korea ........................ 93-21831
Dec. 16, 1993 [KR] Rep. of Korea ........................ 93-27985

[51] Int. Cl.$^6$ ............................. G02B 7/182; G02B 26/08; H01L 41/08; H04R 17/00
[52] U.S. Cl. ........................ 359/224; 359/291; 359/295; 359/855; 359/900; 310/328; 310/348; 310/366; 29/25.35
[58] Field of Search ........................................ 359/224, 225, 359/246, 248, 291, 295, 323, 846, 849, 850, 851, 855, 872, 900; 310/328, 333, 366, 348, 363, 365; 29/25.35

[56] References Cited

U.S. PATENT DOCUMENTS

| | | | |
|---|---|---|---|
| 4,574,438 | 3/1986 | Diepers et al. | 29/25.35 |
| 5,018,256 | 5/1991 | Hornbeck | 359/846 |
| 5,083,857 | 1/1992 | Hornbeck | 359/291 |
| 5,159,225 | 10/1992 | Um | 310/328 |
| 5,469,302 | 11/1995 | Lim | 359/224 |

*Primary Examiner*—Ricky D. Shafer
*Attorney, Agent, or Firm*—Anderson Kill Olick & Oshinsky, P.C.

[57] ABSTRACT

An array of M×N electrodisplacive actuated mirrors for use in an optical projection system is assembled by way of: (a) preparing two identical ceramic wafers; (b) forming M identical trenches thereon; (c) interlocking and bonding together to form a ceramic block; (d) forming a composite ceramic structure from the ceramic block by polishing the top and bottom surfaces thereof: (e) providing M×N signal electrodes and M+1 bias electrodes on the bottom and top surfaces thereof, respectively; (f) mounting on an active matrix to thereby form an array of M×N actuators; (g) preparing platforms, to be formed thereon a light reflecting layer; (h) forming the light reflecting layer; (i) patterning the light reflecting layer, including the platform into an array of M×N mirrors; and (j) making electrical connections to thereby form the array of M×N electrodisplacive actuated mirrors.

22 Claims, 15 Drawing Sheets

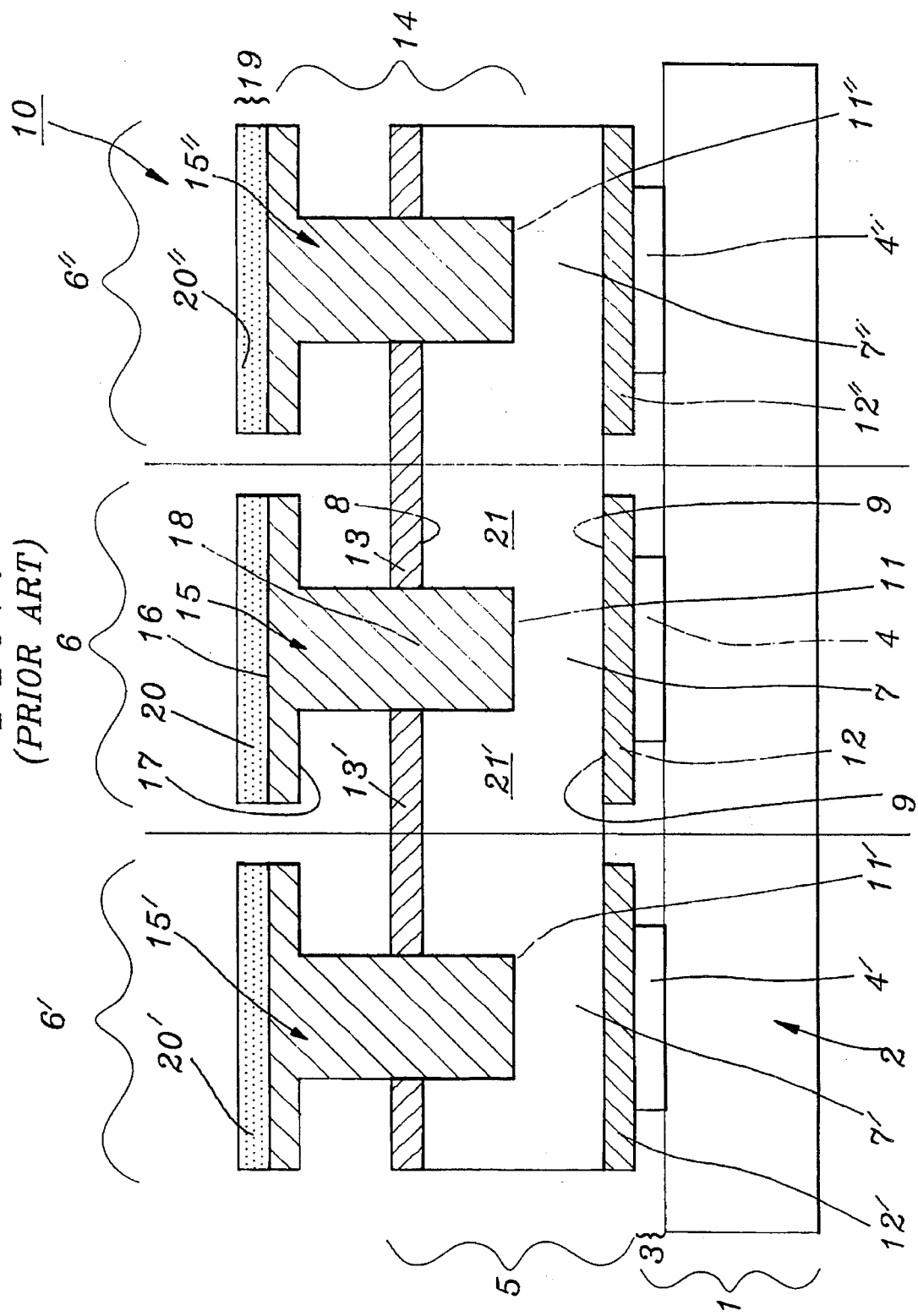

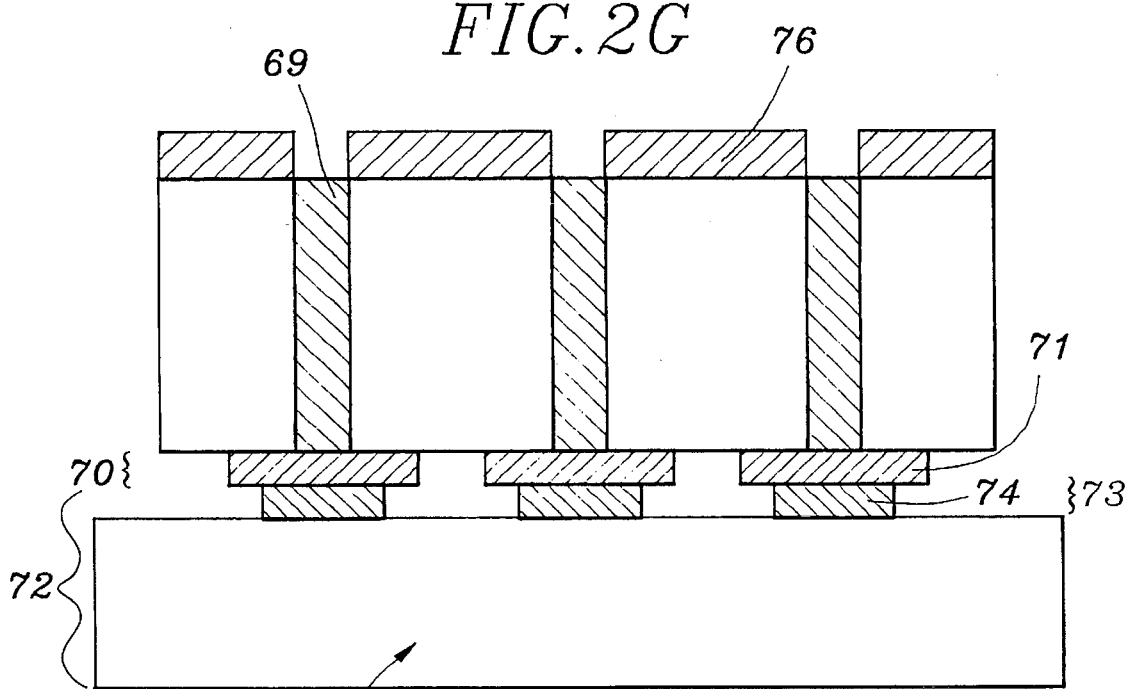
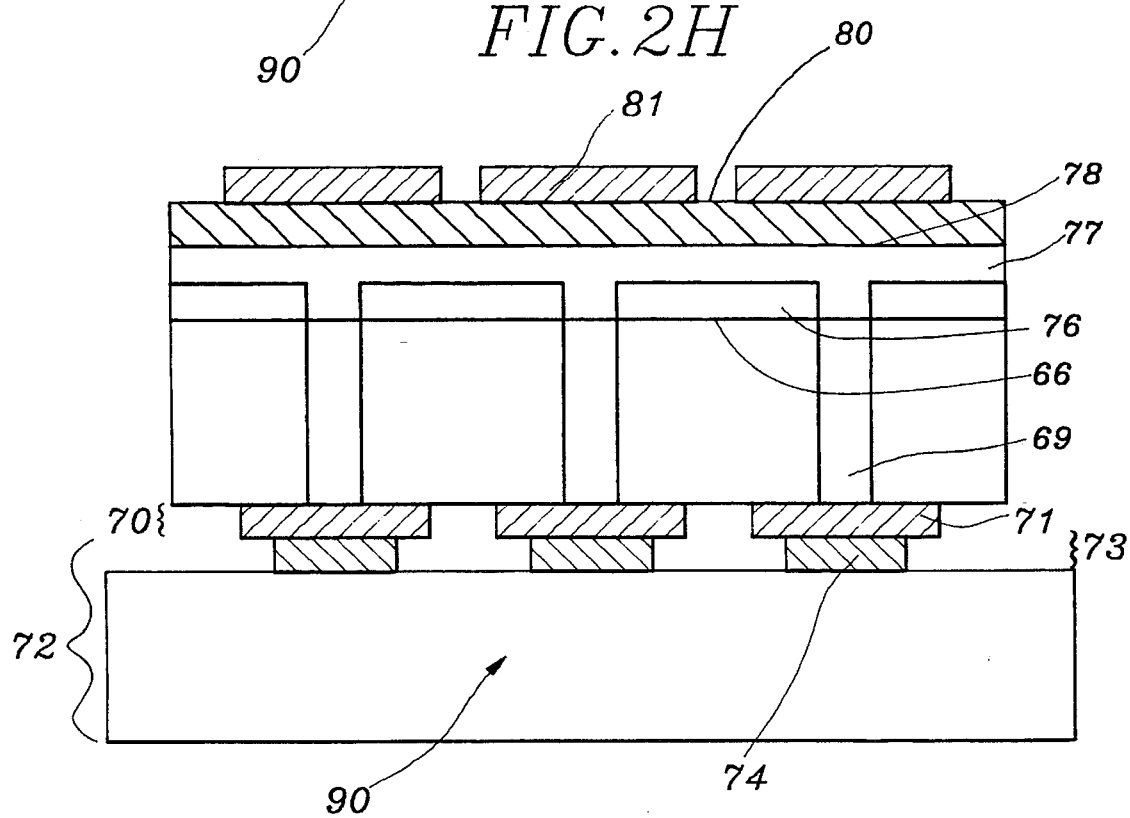

ARRAY OF ELECTRODISPLACIVE ACTUATED MIRRORS AND METHOD FOR THE MANUFACTURE THEREOF

FIELD OF THE INVENTION

The present invention relates to an optical projection system; and, more particularly, to an array of electrodisplacive actuated mirrors for use in the system and an improved method for manufacturing same.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an M×N electrodisplacive actuated mirror array 10 for use in an optical projection system, wherein the actuators are made of a piezoelectric material, disclosed in a copending commonly owned application, U.S. Ser. No. 08/246,891, entitled "PIEZOELECTRIC ACTUATED MIRROR ARRAY AND METHOD FOR THE MANUFACTURE THEREOF", comprising: an active matrix 1 including a substrate 2, an array of transistors (not shown) and an array 3 of M×N connecting terminals, e.g., 4,4',4"; an array 5 of M×N piezoelectric actuators, e.g., 6,6',6", wherein each of the M×N piezoelectric actuators, e.g., 6, includes a piezoelectric member 7 having a top and a bottom surfaces, 8, 9, the top surface 8 being evenly separated by a trench 11 of a fixed depth and a centerline along a vertical direction, formed on the piezoelectric member 7, thereby generating a pair of actuating members 21,21', a signal electrode 12 located on the bottom surface 9 whose centerline along the vertical direction coincides with the centerline of the trench 11, and a pair of common reference electrodes, 13, 13', located on the separated top surface; an array 14 of M×N hinges, e.g., 15,15', 15", each of the M×N hinges, e.g., 15, being provided with a top surface 16 and a bottom surface 17 having a protrusion 18 fitted to the trench 11 in each of the M×N piezoelectric actuators 6; and an array 19 of M×N mirrors, e.g., 20,20', 20", wherein each of the M×N mirrors, e.g., 20, is mounted on the top surface 16 of each of the M×N hinges 15. The polarization directions of the piezoelectric material in the pair of actuating members 21,21' in each piezoelectric member 7, are opposite from each other.

In the above mentioned, copending, commonly owned application, there is also disclosed a method for manufacturing such an array of M×N piezoelectric actuated mirrors, the method comprising the steps of:

(1) obtaining a piezoelectric ceramic wafer having a top and a bottom surfaces; (2) forming an array of M×N signal electrodes on the bottom surface of the ceramic wafer and M+1 common reference electrodes on the top surface thereof; (3) mounting the ceramic wafer treated in accordance with above described step on an active matrix; (4) covering the M+1 common reference electrodes with M+1 photoresistive necked segments; (5) forming M trenches by using an etching method, wherein each of the M trenches, having a width of 50–70 μm and a depth of 50–100 μm, respectively, is located between two common reference electrodes and on the centerline of the signal electrodes, runs parallel to the common reference electrodes, is provided with a set of N–1 identically sized grooves, running perpendicular thereto; (6) forming a platform provided with a top surface by covering with an epoxy the entirety of the top surface of the ceramic wafer treated in accordance with above described steps, including the M trenches; (7) providing a light reflecting layer on the top surface of the platform, thereby forming a mirror layer, including the platform and the light reflecting layer; (8) patterning the mirror layer into an array of M×N mirrors; (9) removing the M+1 photoresistive necked segments; and (10) making electrical connections to thereby form the array of M×N piezoelectric actuated mirrors.

There is a number of problems associated with the above-described method for manufacturing an array of M×N electrodisplacive actuated mirrors, however. First of all, if the actuators are made of a piezoelectric material, in order for the array to function properly, the polarization directions thereof in the horizontally nearest neighboring actuators must be opposite from each other and those of the vertically nearest neighboring actuators must be the same. This is usually achieved by poling the piezoelectric material in two stages, which is an extremely difficult and also very cumbersome process.

Further, it is rather difficult and time consuming to form the M trenches, each trench having, as stated above, a width of 50–70 μm and a depth of 50–100 μm, precisely on the electrodisplacive material.

In addition, it is difficult to obtain a platform provided with a top surface which is truely flat using the above described step (6), which in turn leads to an uneven light reflecting layer in the mirror layer.

SUMMARY OF THE INVENTION

It is, therefore, a primary object of the present invention to provide a method for manufacturing an array of M×N electrodisplacive actuated mirrors, which requires less manufacturing time, less cumbersome, and is, at the same time, easier to practice.

It is another object of the present invention to provide a method for manufacturing an array of M×N piezoelectric actuated mirrors which dispenses with a poling step during the manufacturing thereof.

It is yet another object of the present invention to provide a method for manufacturing an array of M×N electrodisplacive actuated mirrors, capable of ensuring a truely flat light reflecting layer.

It is a further object of the present invention to provide a method for manufacturing an array of M×N electrodisplacive actuated mirrors, capable of readily incorporating an array of M×N hinges on an array of M×N electrodisplacive actuators.

In accordance with one aspect of the present invention, there is provided a method for manufacturing an array of M×N electrodisplacive actuated mirrors for use in an optical projection system, M and N indicating the number of columns and rows in said array, respectively, comprising the steps of: (a) preparing a first ceramic wafer made of an electrodisplacive material and having a flat top and a flat bottom surfaces; (b) forming M vertically directional first trenches on the entirety of the flat top surface of said first ceramic wafer, wherein each of the M first trenches has a pair of side surfaces and a bottom surface and two neighboring first trenches are separated by a barrier formed therebetween, said barrier having a top surface; (c) preparing a second ceramic wafer made of said electrodisplacive material and having a flat top and a flat bottom surfaces; (d) treating the second ceramic wafer in accordance with said step (b); (e) covering the entirety of the flat top surfaces of the first and second ceramic wafers treated in accordance with said step (b), including the pair of side surfaces and the bottom surface of each of the first trenches, with an electrically nonconducting adhesive; (f) bonding together the first and second ceramic wafers treated in accordance with said steps (b) and (e) in such a way that the top surfaces of the barriers in the first ceramic wafer are in contact with the bottom surfaces of the first trenches in the second ceramic wafer, thereby forming a ceramic block having a top and a bottom surfaces; (g) obtaining a composite ceramic structure having a flat top and a flat bottom surfaces with a fixed surface area by polishing the top and bottom surfaces of said ceramic block until the bottom surfaces of the first trenches in the second ceramic wafer and the top surfaces of the barriers in said first ceramic wafer are completely removed, wherein said composite ceramic structure is comprised of M+1 blocks of the electrodisplacive material and M boundaries, each block being horizontally bounded by a pair of boundaries, each boundary being made of a pair of side surfaces separated by the electrically nonconducting adhesive, one of the pair of side surfaces being from the first ceramic wafer and the other side surface being from the second ceramic wafer; (h) forming an array of M×N signal electrodes on the flat bottom surface of said composite ceramic structure, each of the signal electrodes having a vertically directional centerline, coinciding with one of the M boundaries, and overlapping with two neighboring blocks; (i) mounting said composite ceramic structure treated in accordance with said steps (g) and (h) on an active matrix, having a substrate, an array of transistors and an array of connecting terminals, in such a way that each of the M×N signal electrodes is in contact with each corresponding one of the M×N connecting terminals; (j) covering the entirety of the flat top surface of said composite ceramic structure treated in accordance with said steps (g) to (i) with a layer of an electrically conducting metal, wherein the layer is provided with a top surface; (k) patterning the electrically conducting metal layer into M+1 bias electrodes by removing portions of the layer covering the M boundaries; (l) placing on the flat top surface of said composite ceramic structure treated in accordance with said steps (g) to (k) N identical photoresistive segments at a regular interval, each segment having an identical top surface area, wherein a combined total top surface area of the N segments does not exceed the surface area of the flat top surface of said composite ceramic structure, thereby leaving N−1 identical portions on the flat top surface thereof not covered, each of the N−1 portions running normal to the M boundaries; (m) forming N−1 horizontally directional second trenches of a fixed depth and width at the portions not covered by the N photoresistive segments; (n) removing the N photoresistive segments; (o) forming a photoresist layer having a top surface by covering the entirety of the flat top surface of said composite ceramic structure treated in accordance with said steps (g) to (h), including the N−1 horizontally directional second trenches, with a photoresist; (p) providing a transparent layer having a flat top surface on the top surface of the photoresist layer; (q) placing m vertically directional, identical masks on the flat top surface of the photoresist layer, each masks having a vertically directional centerline, in such a way that the centerline for each of the masks coincides with that of the signal electrodes in the same column and each mask overlaps with two neighboring bias electrodes when projected onto the flat bottom surface of said composite ceramic structure treated in accordance with said steps (g) to (p); (r) exposing said composite ceramic structure treated in accordance with said steps (g) to (p) under an ultraviolet light to thereby dividing the photoresist layer into regions of exposed layer and unexposed layer; (s) removing the M vertically directional masks; (t) providing a light reflecting layer on the flat top surface of the transparent layer, thereby forming a mirror layer, including the light reflecting layer and the transparent layer; (u) patterning the mirror layer into an array of M×N mirrors; (v) removing the exposed photoresist layer; and (x) completing electrical connections to thereby form said array of M×N electrodisplacive actuated mirrors.

In accordance with another aspect of the present invention, there is provided a method for manufacturing an array of M×N electrodisplacive actuated mirrors for use in an optical projection system, comprising the steps of: (a) preparing a first ceramic wafer made of an electrodisplacive material and having a flat top and a flat bottom surfaces; (b) forming M vertically directional first trenches on the entirety of the flat top surface of said first ceramic wafer, wherein each of the M first trenches has a pair of side surfaces and a bottom surface and two neighboring first trenches are separated by a barrier formed therebetween, said barrier having a top surface; (c) preparing a second ceramic wafer made of said electrodisplacive material and having a flat top and a flat bottom surfaces; (d) treating the second ceramic wafer in accordance with said step (b); (e) covering the entirety of the flat top surfaces of the first and second ceramic wafers treated in accordance with said step (b), including the pair of side surfaces and the bottom surface of each of the first trenches, with an electrically nonconducting adhesive; (f) bonding together the first and second ceramic wafers treated in accordance with said steps (b) and (e) in such a way that the top surfaces of the barriers in the first ceramic wafer are in contact with the bottom surfaces of the first trenches in the second ceramic wafer, thereby forming a ceramic block having a top and a bottom surfaces; (g) obtaining a composite ceramic structure having a flat top and a flat bottom surfaces with a fixed surface area by polishing the top and bottom surfaces of said ceramic block until the bottom surfaces of the first trenches in the second ceramic wafer and the top surfaces of the barriers in the first ceramic wafer are completely removed, wherein said composite ceramic structure is comprised of M+1 blocks of the electrodisplacive material and M boundaries and having a vertically directional centerline, each block being horizontally bounded by a pair of boundaries, each boundary being made of a pair of side surfaces separated by the electrically nonconducting adhesive, one of the pair of side surfaces being from the first ceramic wafer and the other side surface being from the second ceramic wafer; (h) forming an array of M×N signal electrodes on the flat bottom surface of said composite ceramic structure, each of the signal electrodes having a vertically directional centerline, coinciding with one of the M boundaries, and overlapping with two neighboring blocks; (i) mounting said composite ceramic structure treated in accordance with said steps (g) and (h) on an active matrix, having a substrate, an array of transistors and an array of connecting terminals, in such a way that each of the M×N signal electrodes is in contact with each corresponding one of the M×N connecting terminals; (j) covering the entirety of the flat top surface of said composite ceramic structure treated in accordance with said steps (g) to (i) with an electrically conducting first metal layer, wherein the layer is provided with a top surface; (k) forming M+1 bias electrodes, each of the bias electrodes having a vertically directional centerline, by removing the electrically conducting first metal layer covering the M boundaries and portions of the first metal layer on two opposite sides of each boundary, wherein the verically directional centerline of each bias electrode coincides with that of each block, each bias electrode partially covers each corresponding block and each bias electrode overlaps two horizontally neighboring signal electrodes placed on the flat bottom surface of said composite ceramic structure when projected thereto; (l) covering the entirety of the flat top surface of said composite ceramic structure treated in accordance with said steps (g) to (h) with a second metal layer; (m) patterining the second metal layer in such a way that each of the M+1 bias electrodes and the M boundaries are covered with the second metal layer, leaving the portions of the two opposite sides of each boundary uncovered; (n) providing a platform with a top surface by covering with an epoxy the entirety of the flat top surface of said composite ceramic structure treated in accordance with said steps (g) to (m); (o) patterning the platform into an array of M×N hinges having a top surface using a photolithography method; (p) removing the second metal layer covering the M+1 bias electrodes; (q) providing a supporting layer having a flat top surface on the top surface of each of the M×N hinges; (r) forming a mirror layer on the flat top surface of each supporting layer by sputtering thereon with a light reflecting material; and (s) completing electrical connections to thereby form said array of M×N electrodisplacive actuated mirrors.

BRIEF DESCRIPTION OF THE DRAWINGS

The above and other objects and features of the present invention will become apparent from the following description of preferred embodiments given in conjunction with the accompanying drawings, wherein:

FIG. 1 shows a cross sectional view of an array of M×N electrodisplacive actuated mirrors previously disclosed;

FIGS. 2A to 2J are schematic cross sectional views illustrating the manufacturing steps in accordance with a preferred embodiment of the present invention.

DETAILED DESCRIPTION OF THE PREFERRED EMBODIMENTS

Referring now to FIGS. 2 and 3, there are provided schematic cross sectional views of the manufacturing steps for an array of M×N electrodisplacive actuated mirrors in accordance with preferred embodiments of the present invention. It should be noted that like parts appearing in FIGS. 2 and 3 are represented by like reference numberals.

Figure 2A:
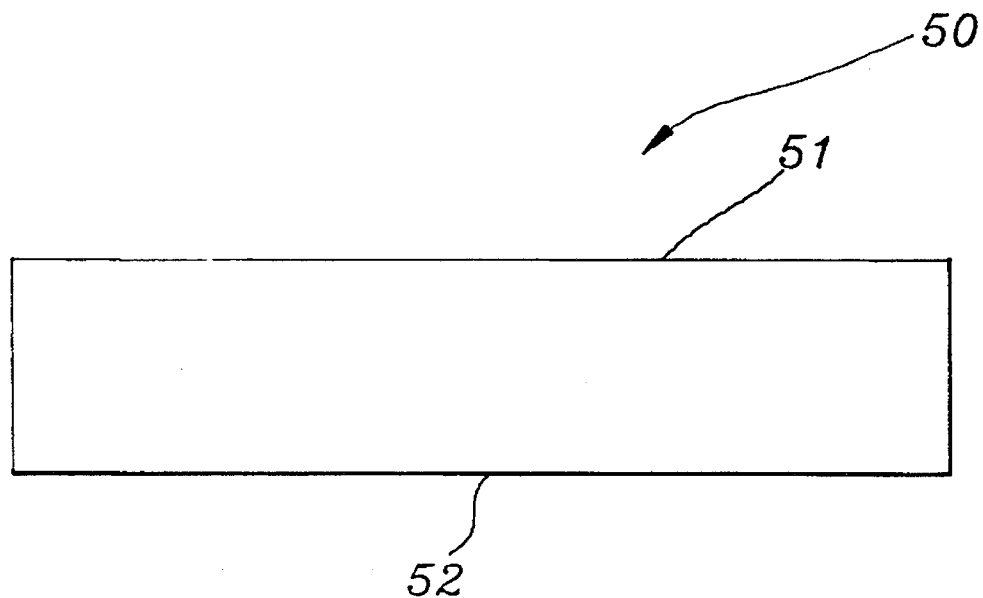

In accordance with the present invention, the process for manufacturing the inventive array of M×N electrodisplacive actuated mirrors, wherein M and N are integers, M indicating the total number of columns in the array, running parallel to the vertical direction and N, the total number of rows therein, running parallel to the horizontal direction, respectively, begins with the preparation of a first ceramic wafer 50, as shown in FIG. 2A, having a thickness of 120–150 µm, made of an electrodisplacive material such as a piezoelectric or an electrostrictive material and having a top and a bottom surfaces 51, 52, wherein the top and the bottom surfaces, 51, 52, are flat and parallel to each other.

Figure 2B:
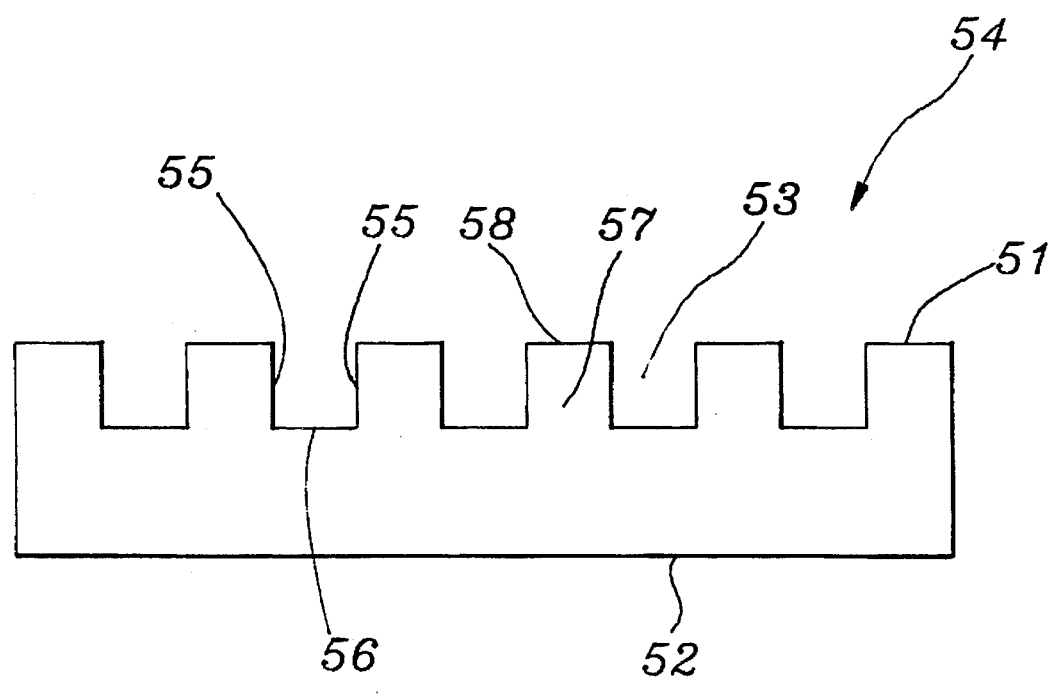

As shown in FIG. 2B, there are formed on the entirety of the top surface of the first ceramic wafer 50 M regularly spaced, vertically directional trenches of a fixed width and depth, 53, by using a mechanical means, e.g., a diamond saw, to thereby form a first ceramic structure 54, wherein each of the M trenches 53, provided with a pair of side surfaces 55 and a bottom surface 56, runs parallel to each other, is separated from each other by a barrier 57, the barrier having a flat top surface 58, and has a width of 50–80 µm and a depth of 70–100 µm.

Figure 2C:
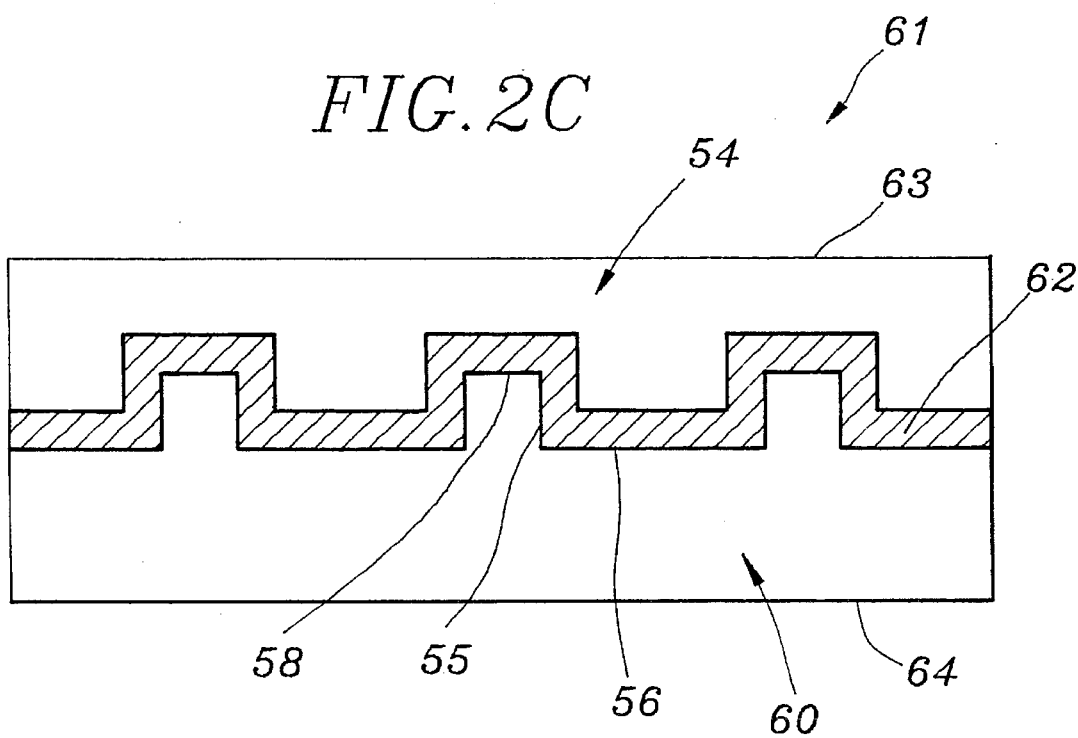

A second ceramic wafer 60, made of the same electrodisplacive material and similarly dimensioned as the first ceramic wafer 50, is processed using the above described procedure in such a way that the resulting second ceramic structure 60 has the identical top surface morphology as the first ceramic structure 54, allowing it to be fitted thereto. The two ceramic structures 54, 60 are interlocked and bonded together to form a ceramic block 61 having a top and a bottom surfaces 63, 64 using an electrically nonconducting adhesive 62, as illustrated in FIG. 2C.

Figure 2D:
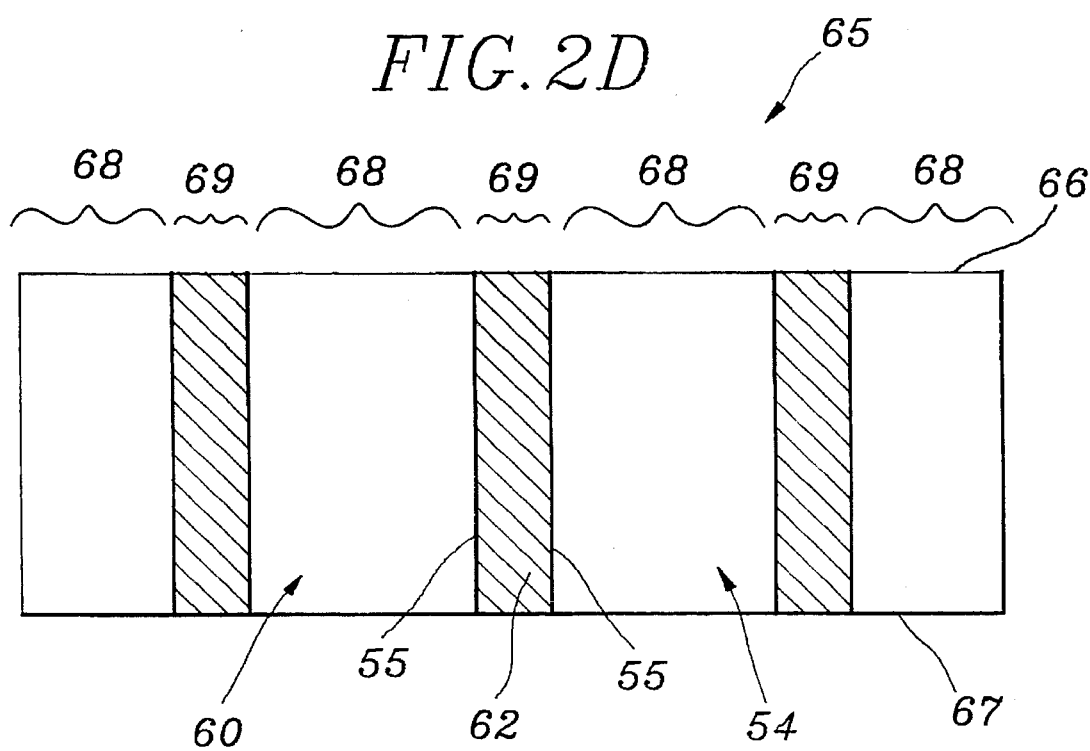

Thereafter, the top and bottom surfaces 63, 64 of the ceramic block 61 are polished until the bottom surfaces 56 of the trenches 53 in the second ceramic structure 60 and the flat top surfaces 58 of the barriers 57 in the first ceramic structure 54, or the vice versa, are completely removed, thereby forming a composite ceramic structure 65, having a flat top and a flat bottom surfaces 66, 67, wherein the composite ceramic structure 65 is comprised of M+1 blocks 68 of the electrodisplacive material and M boundaries 69, each block 68 being horizontally bounded by a pair of boundaries 69, each boundary 69 being made of a pair of side surfaces 55, separated by the electrically nonconducting adhesive 62, one of the pair of side surfaces being from the first ceramic structure 54 and the other side surface being from the second ceramic structure 60. This step is illustrated in FIG. 2D.

Figure 2E:
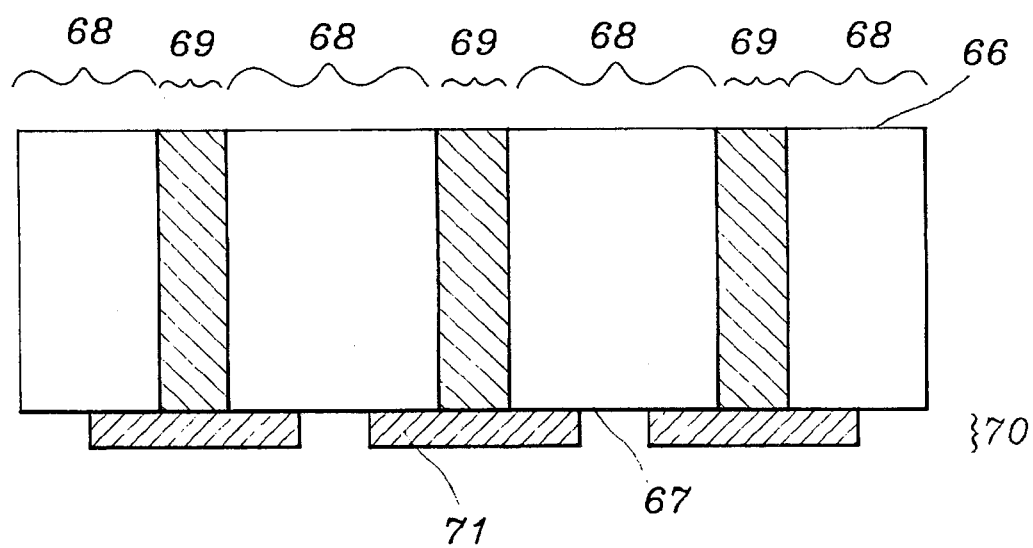

In subsequent step, there is formed on the entirety of the flat bottom surface 67 of the composite ceramic structure 65, as shown in FIG. 2E, an array 70 of M×N signal electrodes 71, wherein each of the signal electrodes 71 has a vertically directional centerline, coinciding with one of the M boundaries 69 and overlapping with two neighboring blocks 68. The array 70 of M×N signal electrodes 71 is formed by first sputtering the flat bottom surface 67 of the composite ceramic structure 65 with an electrically conductive metal, e.g., copper (Cu), and then obtaining the required electrode pattern using a photolighography method.

Figure 2F:
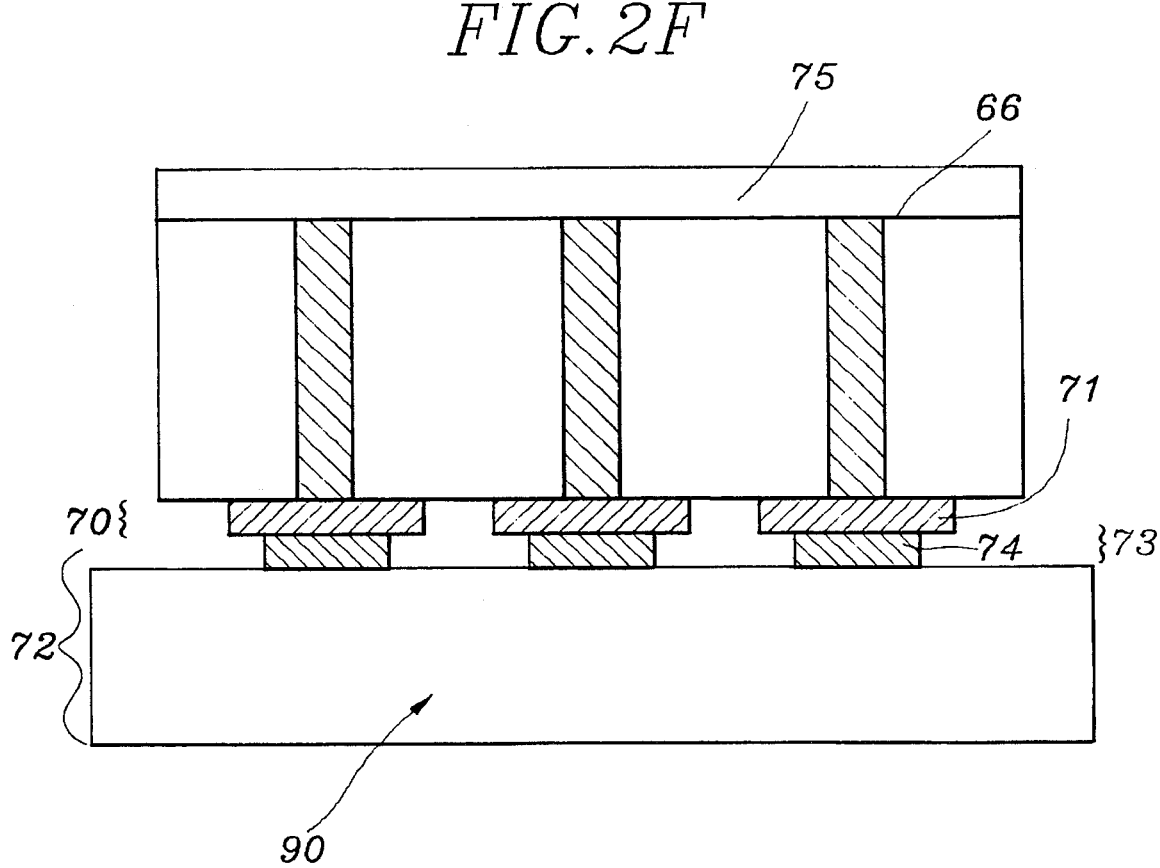

In the next step, the composite ceramic structure 60 treated in accordance with the above described steps is mounted on an active matrix 72, having a substrate 90, an array of M×N transistors (not shown) and an array 73 of M×N connecting terminals 74 using an electrically conductive adhesive in such a way that each of the M×N signal electrodes 71 is in contact with each corresponding one of the M×N connecting terminals 74. Thereafter, as shown in FIG. 2F, the entirety of the flat top surface 66 of the composite ceramic structure 65 is covered with a layer 75 of an electrically conducting metal, e.g., Cu, obtained by sputtering the electrically conducting metal thereon.

In the subsequent step, the electrically conducting metal layer 75 is patterned into M+1 bias electrodes 76 by selectively removing portions thereof covering the M boundaries 69 using a photolithography method, as shown in FIG. 2G. Each of the bias electrodes 76 has a thickness of 0.5–2 μm.

Subsequently, there are placed on the flat top surface 66 of the composite ceramic structure 65 treated in accordance with the above described steps, N identical photoresistive segments (not shown) at a regular interval, each segment having an identical top surface area, wherein a combined total top surface area of the N segments does not exceed the surface area of the flat top surface of the composite ceramic structure 65, thereby leaving N−1 identical portions on the flat top surface thereof not covered, each of the N−1 portions running normal to the M boundaries 69. In the next step, there are formed N−1 horizontally directional second trenches of a fixed depth and width at the portions not covered by the N photoresistive segments by using either a laser trimming method or a conventional photolithography method. The depth and width of the second trenches are 10–20 μm and 5–10 μm, respectively.

Thereafter a photoresist layer 77 having a top surface 78 is formed on the entirety of the flat top surface of the composite ceramic structure treated in accordance with the above described, including the N−1 horizontally directional trenches by covering thereon with a photoresist. The photoresist layer 77, having a thickness of 2–5 μm, can be replaced by a layer made of a polyimide. Subsequently, as illustrated in FIG. 2H, a transparent layer 79, having a flat surface 80 and a thickness of 2–6 μm, is formed on the top surface 75 of the photoresist layer 77 by using either a chemical vapor deposition (CVD) method or a sputtering method. The transparent layer 79 is made of an insulating material, e.g., $SiO_2$ or $Si_3N_4$, the same electrodisplacive as the ceramic wafer 50 or a polymer.

In the subsegment step, as shown in FIG. 2H, M vertically directional, identical masks 81 are provided on the flat top surface 80 of the transparent layer 79, each of the masks 81 having a vertically directional centerline, in such a way that the centerline for each of the masks 81 coincides with that of the signal electrodes 71 in the same column and, when projected onto the flat bottom surface 67 of the composite ceramic structure 65 treated in accordance with the above described procedures, each mask 81 overlaps with two neighboring bias electrodes 76.

Thereafter, the composite ceramic structure 65 treated in accordance with the above described steps is exposed under an ultraviolet light, thereby dividing the photoresist layer 77 into regions of exposed layer 82 and unexposed layer 83.

Figure 2I:
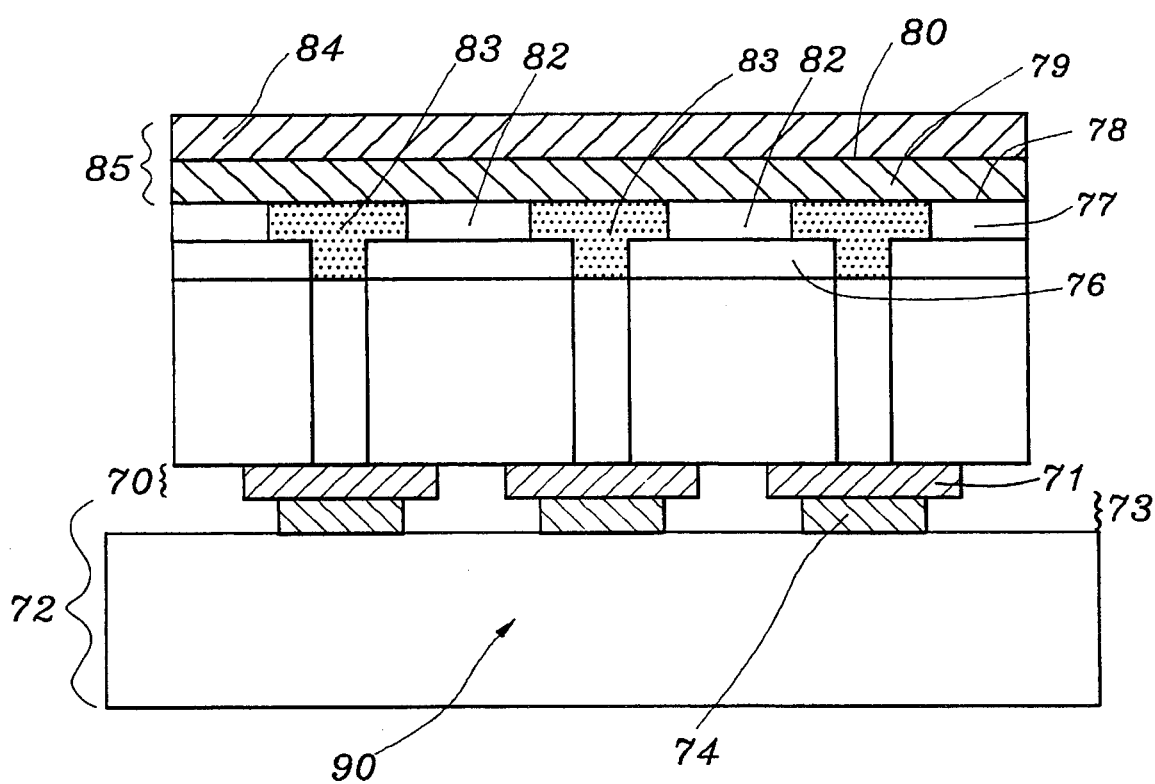

As illustrated in FIG. 2I, the masks 81 are subsequently removed and a light reflecting layer 84 is provided on the flat top surface 80 of the transparent layer 79 to thereby forming a mirror layer 85 comprising the light reflecting layer 84 and the transparent layer 79.

Figure 2J:
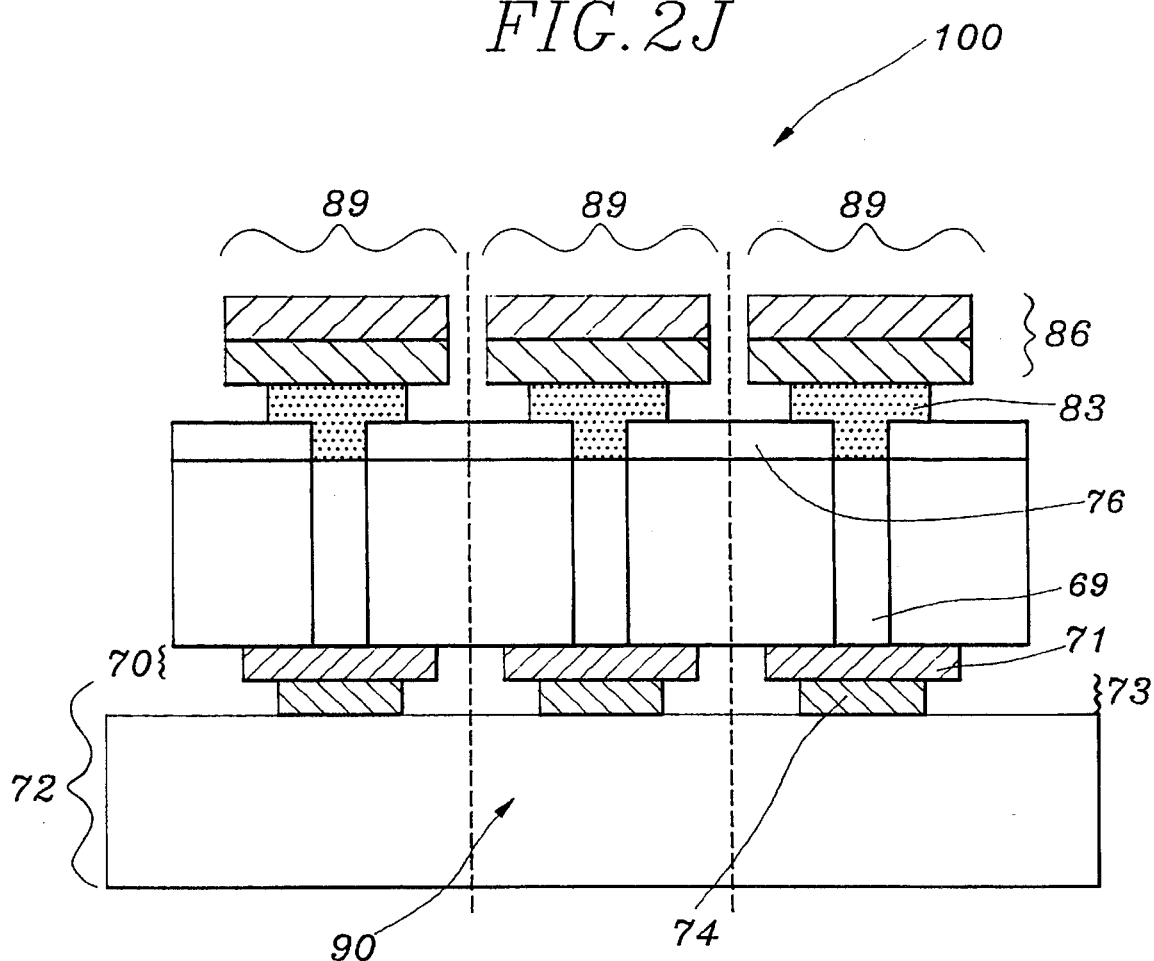

Subsequently, the mirror layer 85 is patterned into an array 86 of M×N mirrors 87 using a photolithography method, the regions of exposed photoresist layer 82 are finally removed and electrical connections are completed to thereby form the array 100 of M×N electrodisplacive actuated mirrors 89, as shown in FIG. 2J.

The above manufacturing steps described need not be followed rigorously in order in manufacturing the array 100 of M×N electrdisplacive actuated mirrors 89; some of the steps can be omitted, combined, and the order can be interchanged.

Figure 3A:
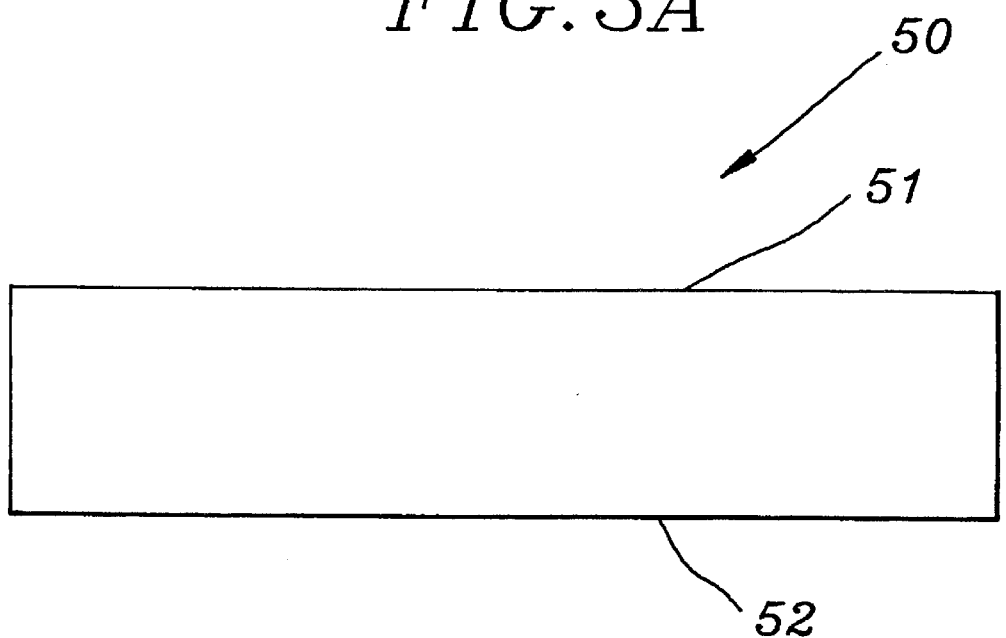
FIGS. 3A to 3N represent schematic cross sectional views describing the manufacturing steps in accordance with another preferred embodiment of the present invention.
Figure 3B:
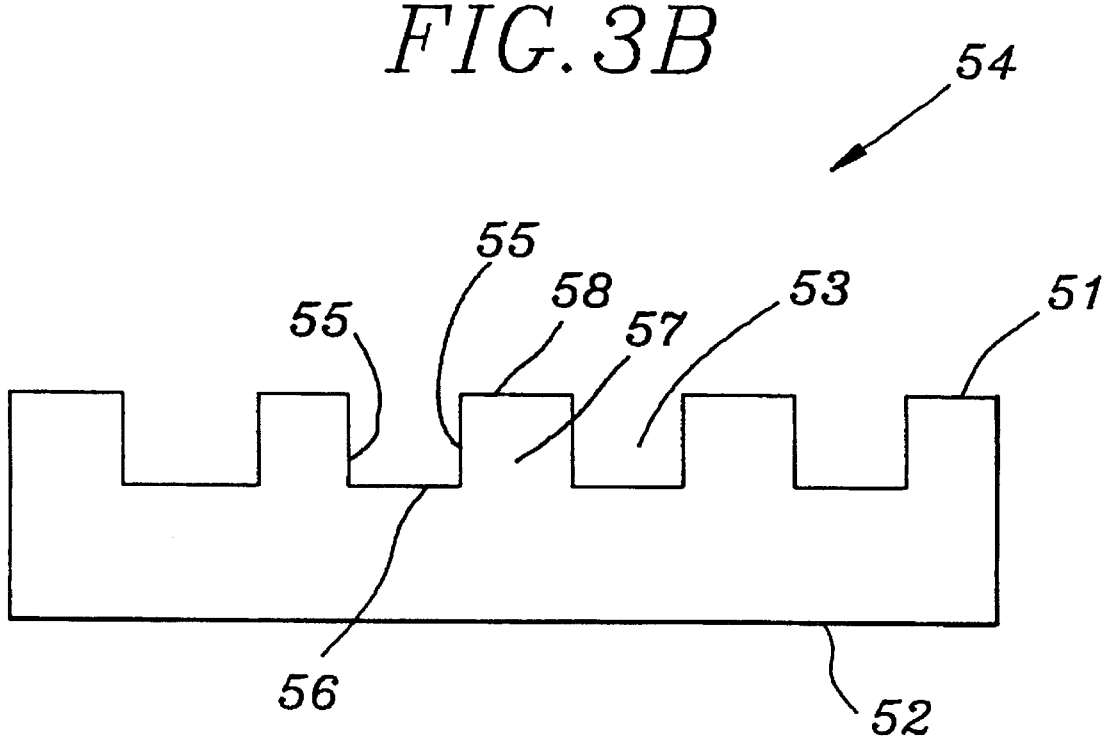
Figure 3C:
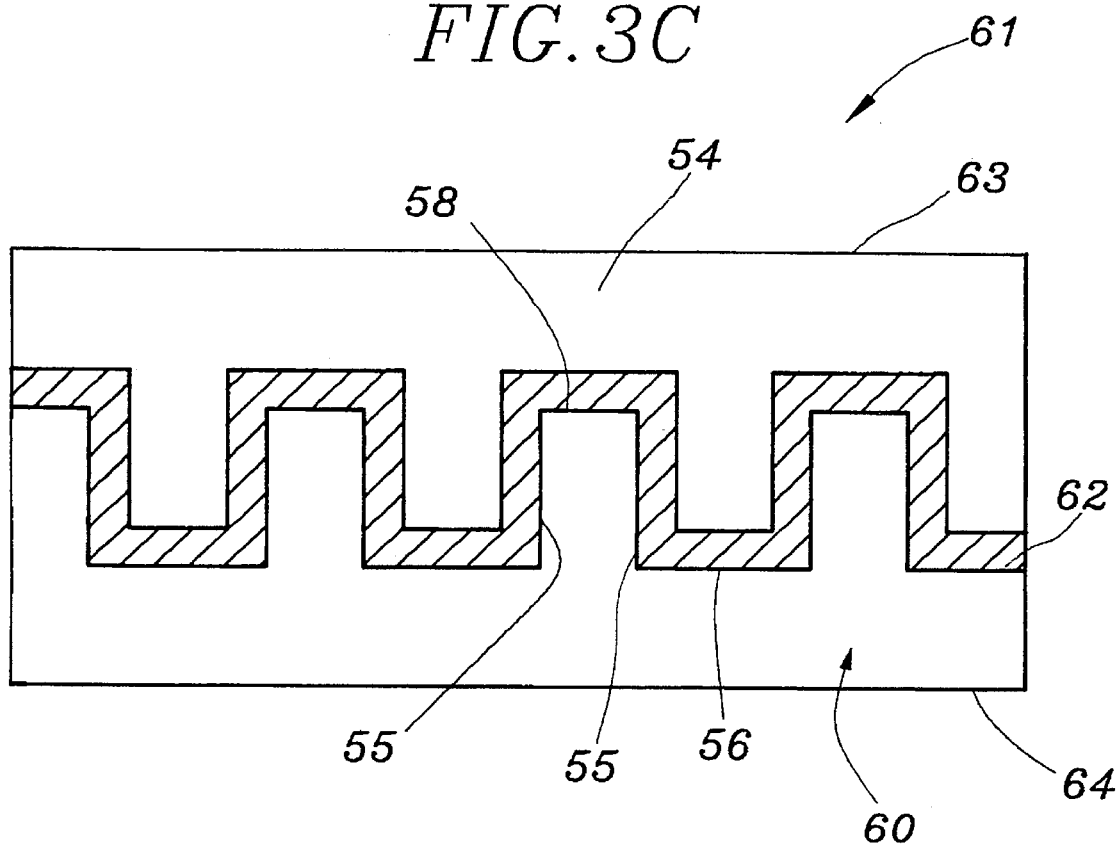
Figure 3D:
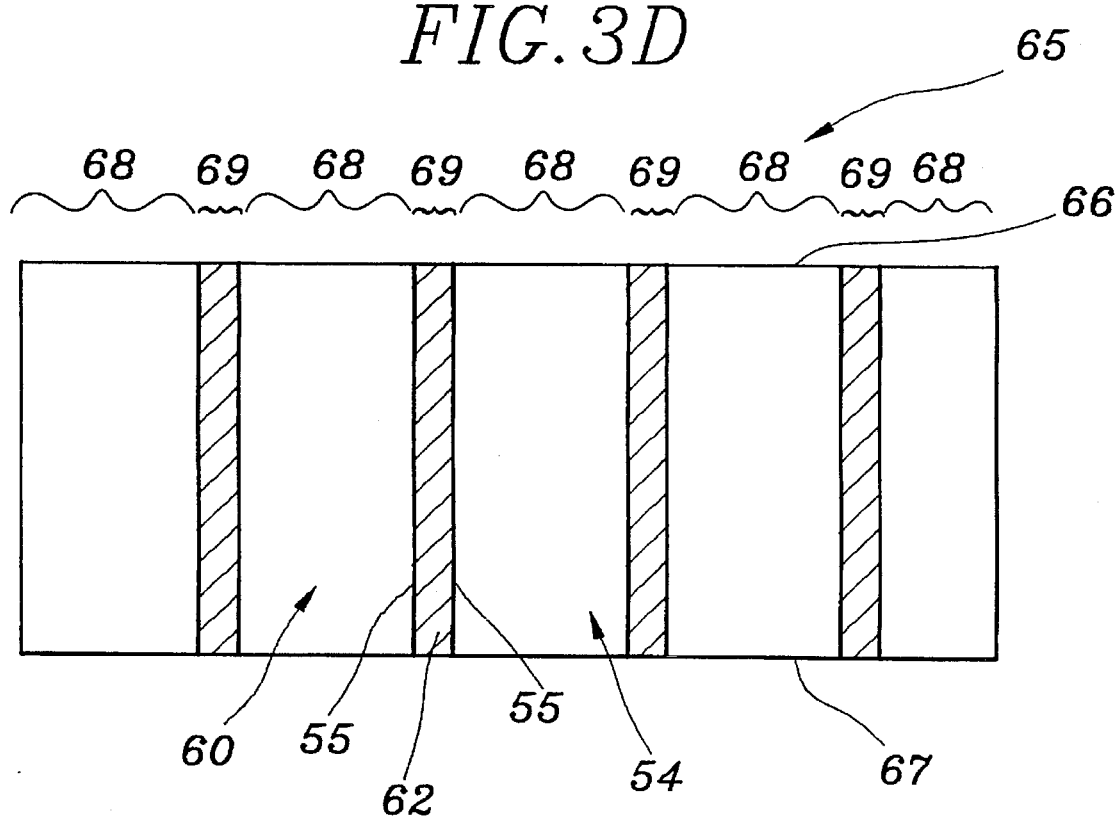
Figure 3E:
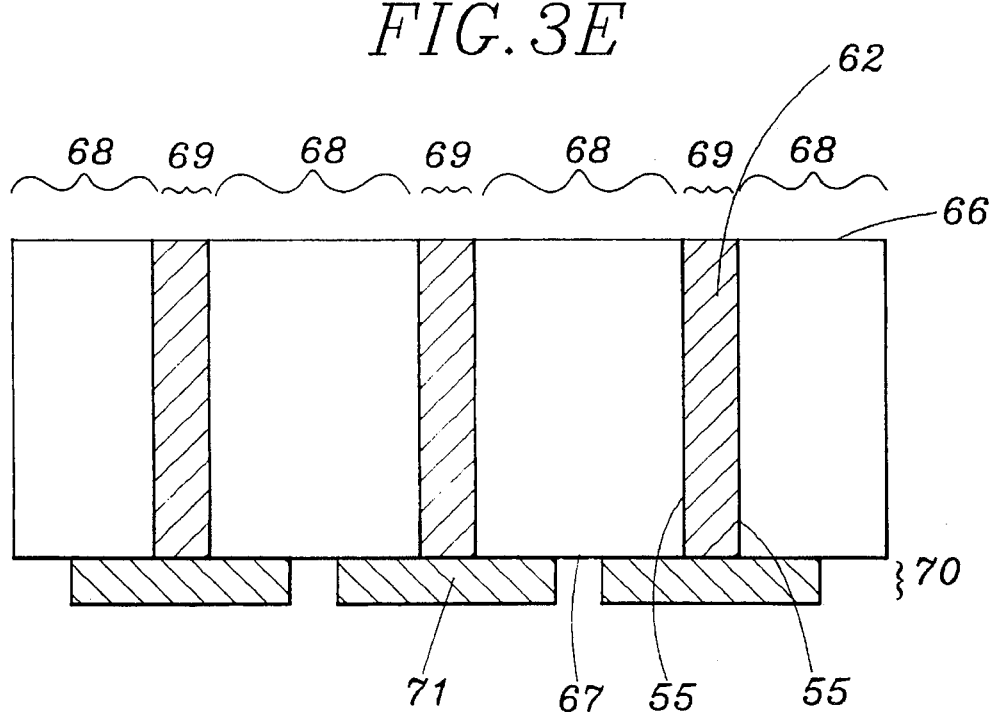
Figure 3F:
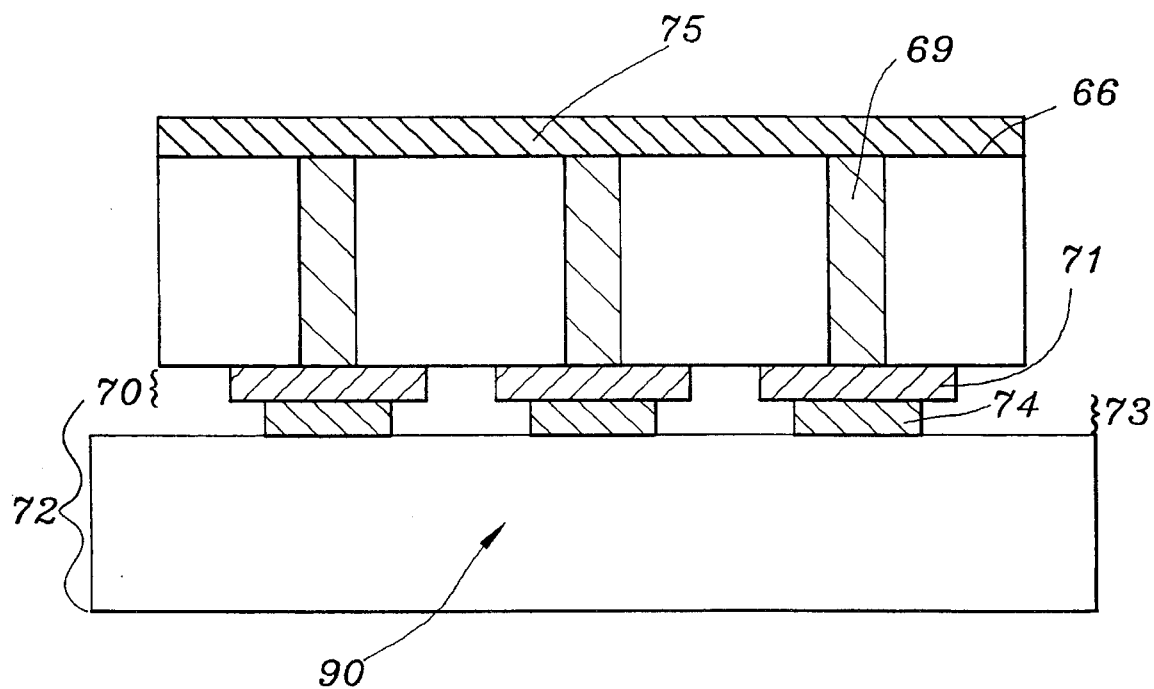
Figure 3G:
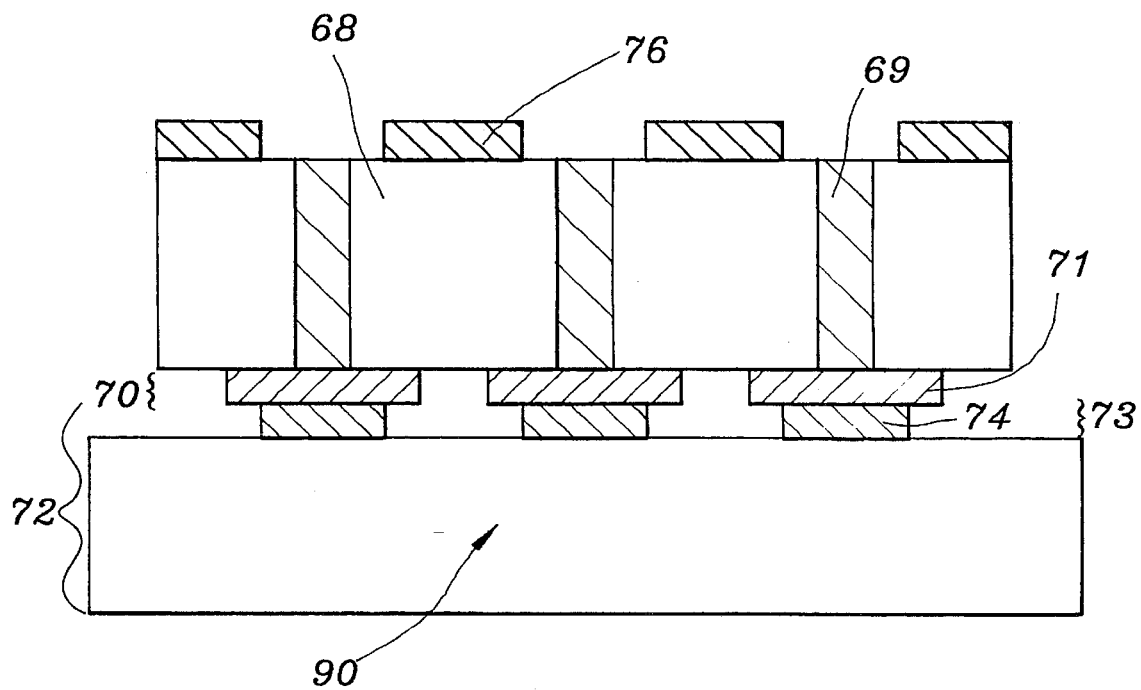
Figure 3H:
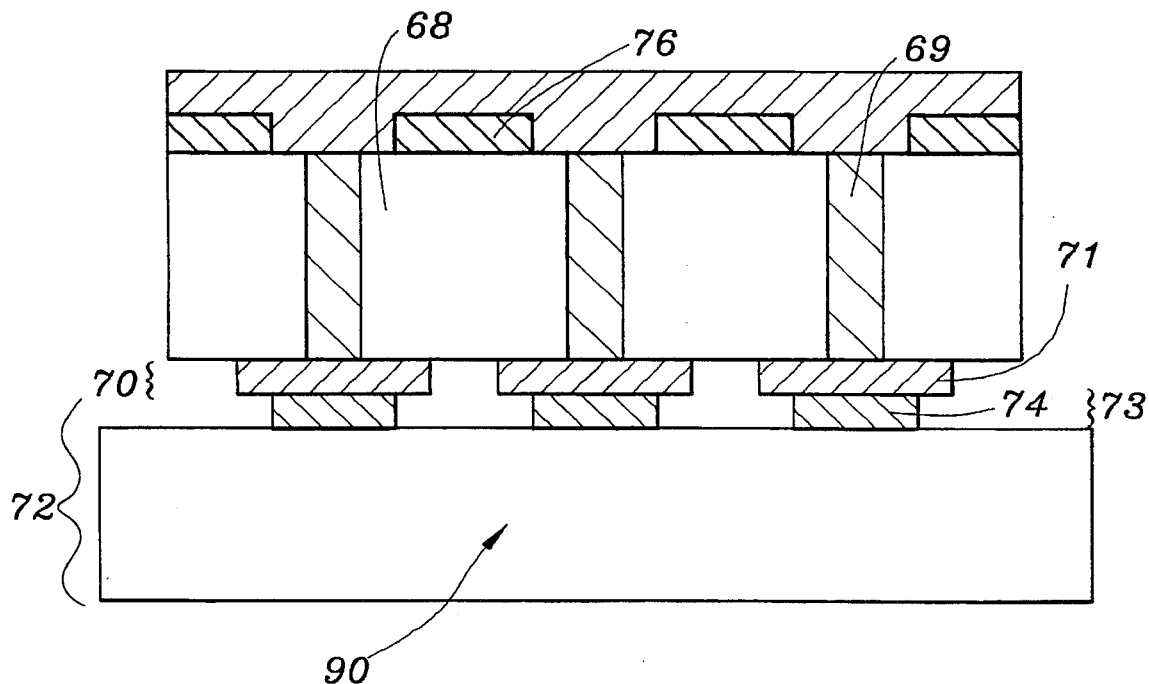
Figure 3I:
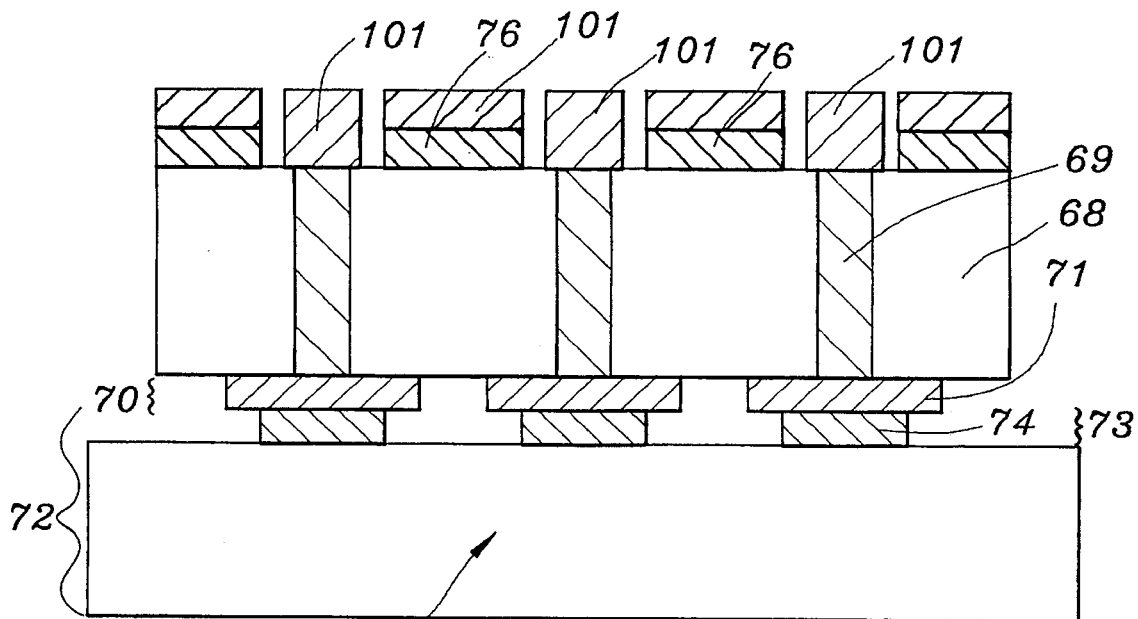
Figure 3J:
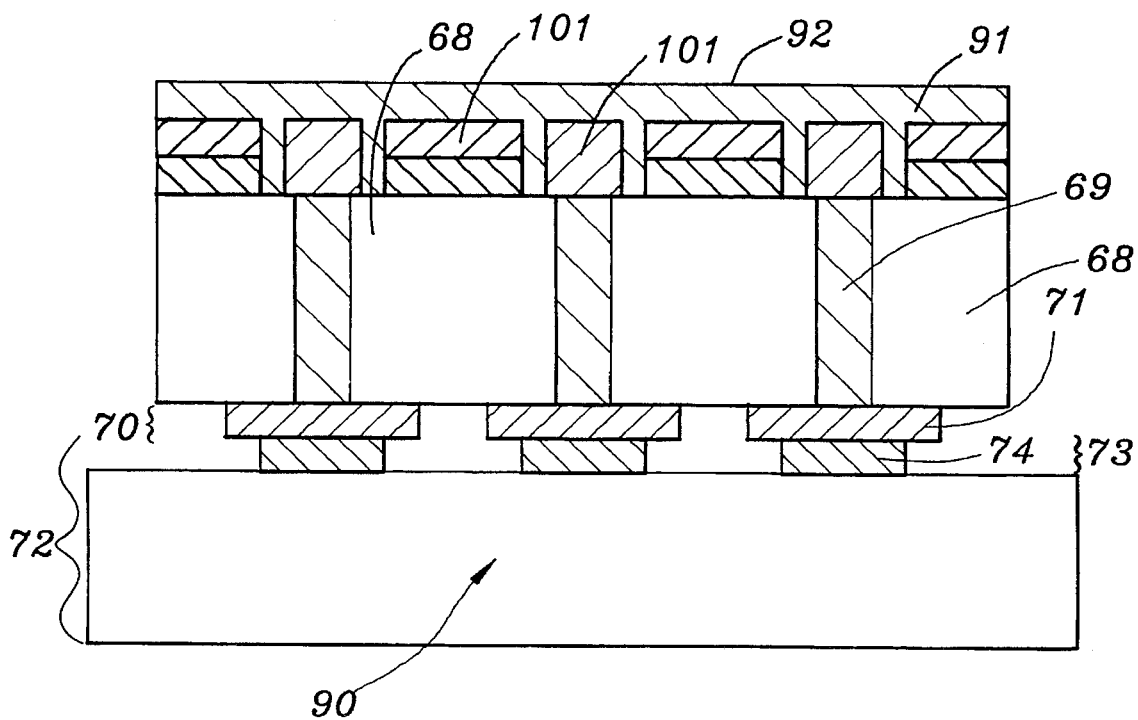
Figure 3K:
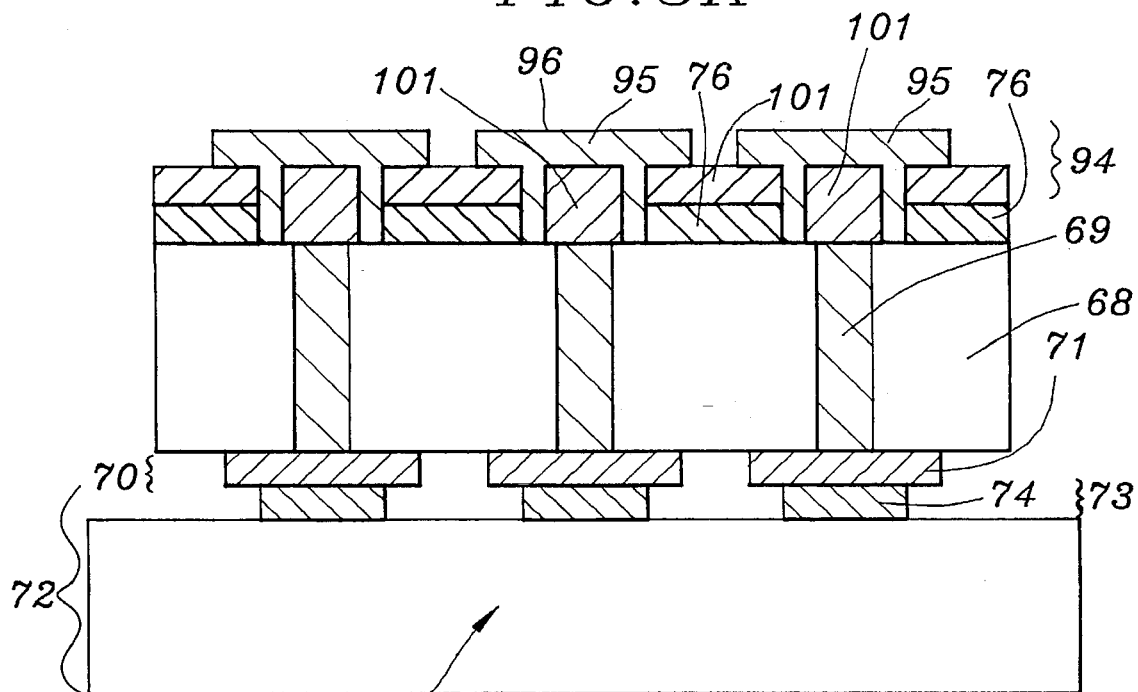
Figure 3L:
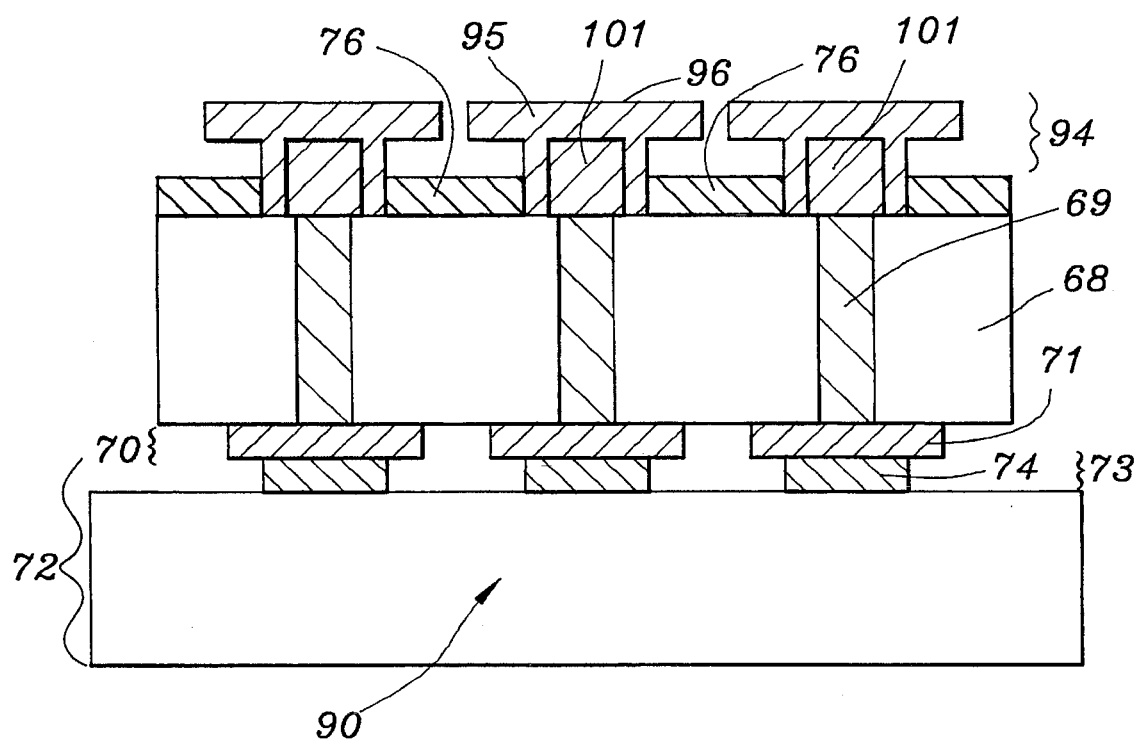
Figure 3M:
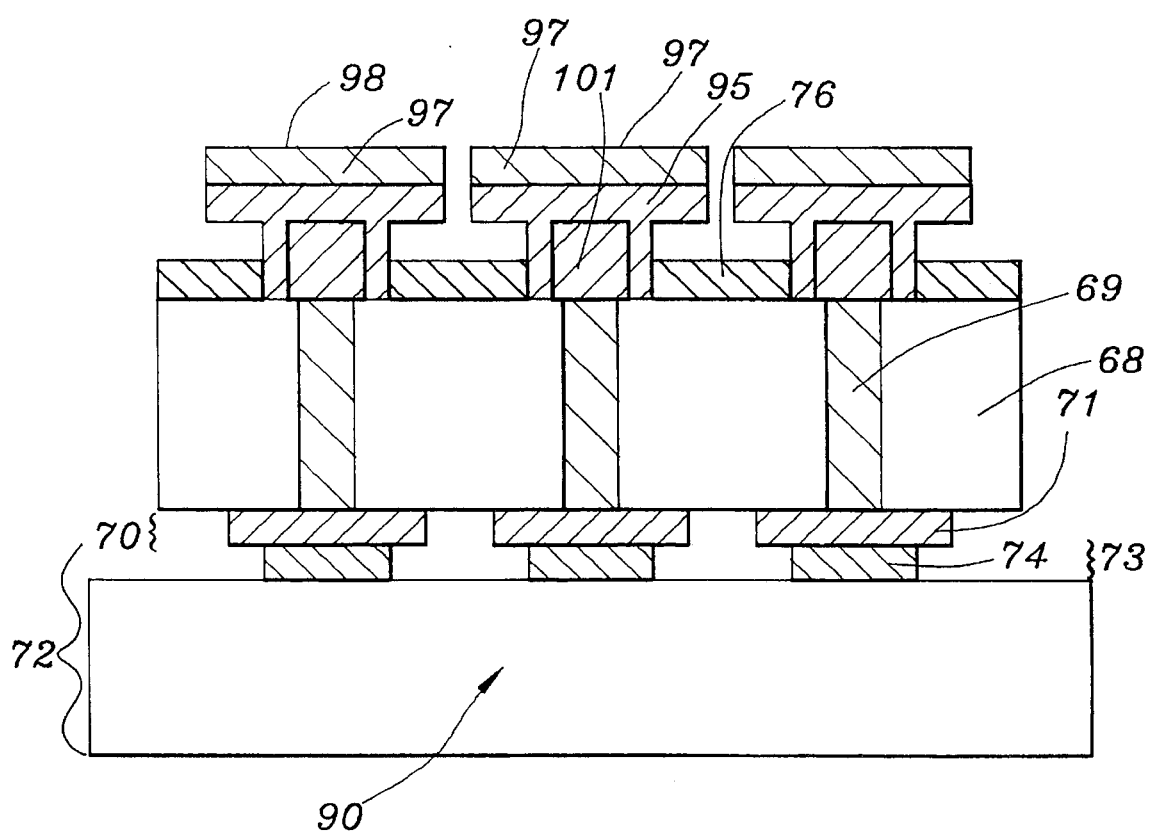
Figure 3N:
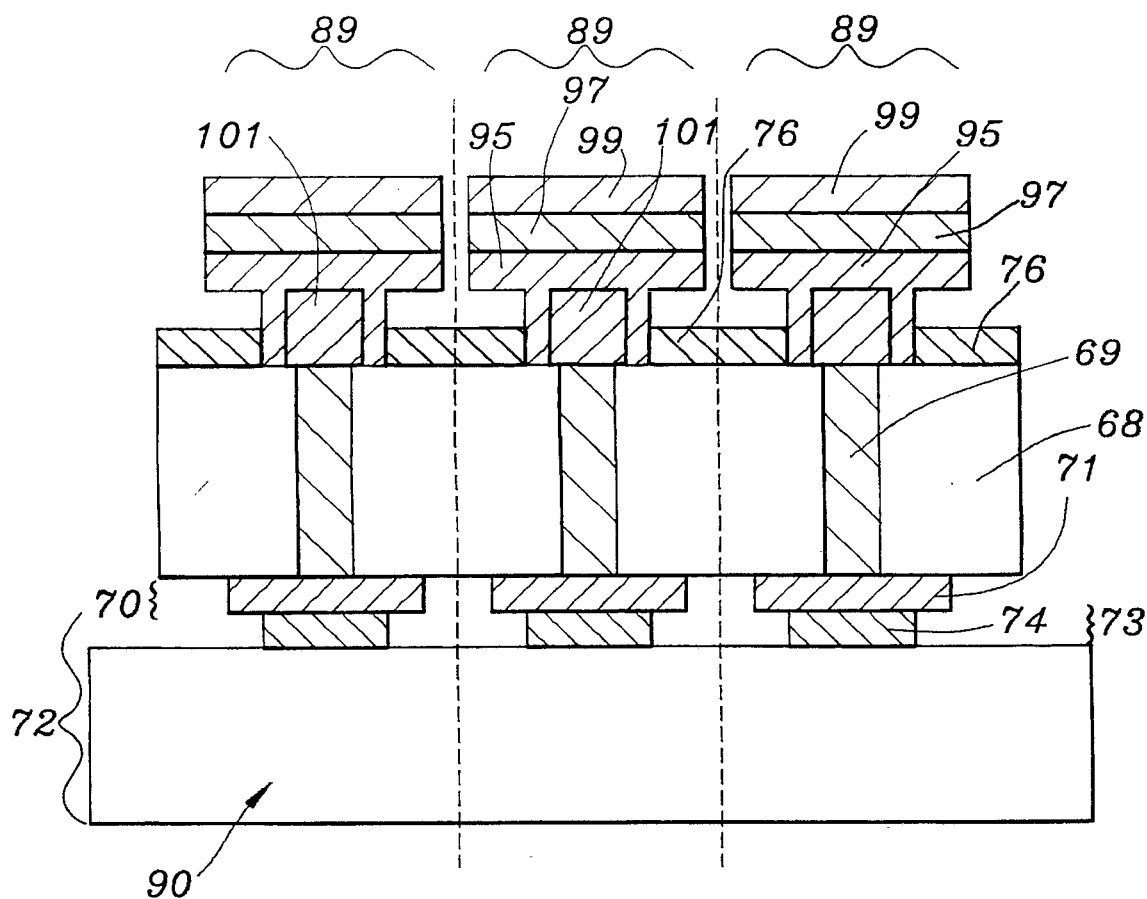

Alternatively, there are illustrated in FIGS. 3A to 3N schematic cross sectional views of the manufacturing steps in accordance with another preferred embodiment of the present invention. As noted hereinabove, like reference numbers in FIGS. 2 and 3 represent like parts provided by like materials and processes employed in FIG. 2.

The manufacturing steps illustrated in FIGS. 2 and 3 are similar to each other, except that, in the latter method: (1) the layer 75 is patterned into the M+1 bias electrodes 76, each of the bias electrodes 76 having a vertically directional centerline, by removing the electrically conducting metal layer 75 covering the M boundaries 69 and portions of the layer on two opposite sides of each boundary, wherein the vertically directional centerline of each bias electrode 76 coincides with that of each block 68, each bias electrode 76 overlaps two horizontally neighboring signal electrodes 71 placed on the flat bottom surface 67 of the composite ceramic structure 65 when projected thereto as depicted in FIG. 3G; (2) the entirety of the flat top surface 66 of the composite ceramic structure 65 treated in accordance with the above described step is covered with a second metal layer 101, made of, e.g., titanium (Ti), and having a thickness of approximately 1 μm, as shown in FIG. 3H; (3) the second metal layer 101 is patterned using a photolithography method in such a way that each of the M+1 bias electrodes 76 and the M boundaries 69 are covered with the second metal layer 101, leaving the portions of the two opposite sides of each boundary 69 uncovered, as illustrated in FIG. 3I; (4) a platform 91 with a top surface 92 is provided by covering with an epoxy the entirety of the flat top surface 66 of the composite ceramic structure 65 treated in accordance with above described step, as represented in FIG. 3J; (5) the platform 91 is patterned into an array 94 of M×N hinges 95 having a top surface 96 using a photolethography method, as shown in FIG. 3K; (6) portions the second metal layer 101 covering the M+1 bias electrodes are removed, as depicted in FIG. 3L; (7) a supporting layer 97, having a flat top surface 98 and made of a nitride, e.g., AlN, is selectively provided on the top surface 96 of each of the M×N hinges 95; and (8) a mirror layer 99 is formed on the flat top surface 98 of each supporting layer 97 by sputtering thereon with a light reflecting material, e.g., Al.

In addition, if the array 100 of M×N electrodisplacive actuated mirrors 89 is made of a piezoelectric material, e.g., PZT, the first and second ceramic wafers 50 are poled prior to undergoing the above described manufacturing steps.

While the present invention has been described with respect to certain preferred embodiments only, other modifications and variations may be made without departing from the scope of the present invention as set forth in the following claims.

What is claimed is:

1. A method for manufacturing an array of M×N electrodisplacive actuated mirrors, M and N indicating the number of columns and rows in said array, respectively, comprising the steps of:

(a) preparing a first ceramic wafer made of an electrodisplacive material and having a flat top and a flat bottom surfaces;

(b) forming M vertically directional first trenches on the entirety of the flat top surface of said first ceramic wafer, wherein each of the first trenches has a pair of side surfaces and a bottom surface and wherein two neighboring first trenches are separated by a barrier formed therebetween, said barrier having a top surface;

(c) preparing a second ceramic wafer made of said electrodisplacive material and having a flat top and a flat bottom surfaces;

(d) treating the second ceramic wafer in accordance with said step (b);

(e) covering the entirety of the flat top surfaces of the first and second ceramic wafers treated in accordance with said step (b), including the pair of side surfaces and the bottom surface of each of the first trenches, with an electrically nonconducting adhesive;

(f) bonding together the first and second ceramic wafers treated in accordance with said steps (b) and (e) in such a way that the top surfaces of the barriers in the first ceramic wafer are in contact with the bottom surfaces of the first trenches in the second ceramic wafer, thereby forming a ceramic block having a top and a bottom surfaces;

(g) obtaining a composite ceramic structure having a flat top and a flat bottom surfaces with a fixed surface area by polishing the top and bottom surfaces of said ceramic block until the bottom surfaces of the first trenches in the second ceramic wafer and the top surfaces of the barriers in the first ceramic wafer are completely removed, wherein said composite ceramic structure is comprised of M+1 blocks of the electrodisplacive material and M boundaries, each block being horizontally bounded by a pair of boundaries, each boundary being made of a pair of side surfaces separated by the electrically nonconducting adhesive, one of the pair of side surfaces being from the first ceramic wafer and the other side surface being from the second ceramic wafer;

(h) forming an array of M×N signal electrodes on the flat bottom surface of said composite ceramic structure, each of the signal electrodes having a vertically directional centerline, coinciding with one of the M boundaries, and overlapping with two neighboring blocks;

(i) mounting said composite ceramic structure treated in accordance with said steps (g) and (h) on an active matrix, having a substrate, and an array of connecting terminals, in such a way that each of the M×N signal electrodes is in contact with each corresponding one of the M×N connecting terminals;

(j) covering the entirety of the flat top surface of said composite ceramic structure treated in accordance with said steps (g) to (i) with a layer of an electrically conducting metal, wherein the layer is provided with a top surface;

(k) patterning the electrically conducting metal layer into M+1 bias electrodes by removing the layer covering the M boundaries;

(l) placing on the flat top surface of said composite ceramic structure treated in accordance with said steps (g) to (k) N identical photoresistive segments at a regular interval, each segment having an identical top surface area, wherein a combined total top surface area of the N segments does not exceed the surface area of the flat top surface of said composite ceramic structure, thereby leaving N−1 identical portions on the flat top surface thereof not covered, each of the N−1 portions running normal to the M boundaries;

(m) forming N−1 horizontally directional second trenches of a fixed depth and width at the portions not covered by the N photoresistive segments;

(n) removing the N photoresistive segments;

(o) forming a photoresist layer having a top surface by covering the entirety of the flat top surface of said composite ceramic structure treated in accordance with said steps (g) to (h), including the N−1 horizontally directional second trenches, with a photoresist;

(p) providing a transparent layer having a flat top surface on the top surface of the photoresist layer;

(q) placing m vertically directional, identical masks, each of the masks having a vertically directional centerline, on the flat top surface of the photoresist layer in such a way that the centerline for each of the masks coincides with that of the signal electrodes in the same column and each mask overlaps with two neighboring bias electrodes when projected onto the flat bottom surface of said composite ceramic structure treated in accordance with said steps (g) to (p);

(r) exposing said composite ceramic structure treated in accordance with said steps (g) to (p) under an ultraviolet light to thereby divide the photoresist layer into regions of exposed layer and unexposed layer;

(s) removing the M vertically directional masks;

(t) providing a light reflecting layer on the flat top surface of the transparent layer, thereby forming a mirror layer, including the light reflecting layer and the transparent layer;

(u) patterning the mirror layer into an array of M×N mirrors; and (v) completing electrical connections to thereby form said array of M×N electrodisplacive actuated mirrors.

2. The method of claim 1, wherein the first and second ceramic wafers are made of a piezoelectric material.

3. The method of claim 2, wherein the first and second ceramic wafers are poled prior to said step (b) described in claim 1.

4. The method of claim 1, wherein the array of M×N signal electrodes is formed by first sputtering the flat bottom surface of said composite ceramic structure with an electrically conductive metal and then obtaining the required electrode pattern using a photolithography method.

5. The method of claim 1, wherein said composite ceramic structure is mounted on the active matrix using an electrically conductive adhesive.

6. The method of claim 1, wherein the electrically conducting metal layer is formed on the flat top surface of said composite ceramic structure by covering thereon with an electrically conductive metal.

7. The method of claim 6, wherein the M+1 bias electrodes are obtained by patterning the electrically conducting metal layer using a photolithography method.

8. The method of claim 1, wherein the transparent layer is made of a polymer.

9. The method of claim 1, wherein the transparent layer is made of a dielectric material.

10. The method of claim 1, wherein the mirror layer is patterned into the array of M×N mirrors using a photolithography method.

11. The method of claim 10, wherein the mirror layer is patterned into the array of M×N mirrors using a laser cutting method.

12. A method for manufacturing an array of M×N electrodisplacive actuated mirrors, M and N indicating the number of columns and rows in said array, respectively, comprising the steps of:

(a) preparing a first ceramic wafer made of an electrodisplacive material and having a flat top and a flat bottom surfaces;

(b) forming M vertically directional first trenches on the entirety of the flat top surface of said first ceramic wafer, wherein each of the M first trenches has a pair of side surfaces and a bottom surface and wherein two neighboring first trenches are separated by a barrier formed therebetween, said barrier having a top surface;

(c) preparing a second ceramic wafer made of said electrodisplacive material and having a flat top and a flat bottom surfaces;

(d) treating the second ceramic wafer in accordance with said step (b);

(e) covering the entirety of the flat top surfaces of the first and second ceramic wafers treated in accordance with said step (b), including the pair of side surfaces and the bottom surface of each of the first trenches, with an electrically nonconducting adhesive;

(f) bonding together the first and second ceramic wafers treated in accordance with said steps (b) and (e) in such a way that the top surfaces of the barriers in the first ceramic wafer are in contact with the bottom surfaces of the first trenches in the second ceramic wafer, thereby forming a ceramic block having a top and a bottom surfaces;

(g) obtaining a composite ceramic structure having a flat top and a flat bottom surfaces with a fixed surface area by polishing the top and bottom surfaces of said ceramic block until the bottom surfaces of the first trenches in the second ceramic wafer and the top surfaces of the barriers in the first ceramic wafer are completely removed, wherein said composite ceramic structure is comprised of M+1 blocks of the electrodisplacive material and M boundaries and having a vertically directional centerline, each block being horizontally bounded by a pair of boundaries, each boundary being made of a pair of side surfaces separated by the electrically nonconducting adhesive, one of the pair of side surfaces being from the first ceramic wafer and the other side surface being from the second ceramic wafer;

(h) forming an array of M×N signal electrodes on the flat bottom surface of said composite ceramic structure, each of the signal electrodes having a vertically directional centerline, coinciding with one of the M boundaries, and overlapping with two neighboring blocks;

(i) mounting said composite ceramic structure treated in accordance with said steps (g) and (h) on an active matrix, having a substrate, and an array of connecting terminals, in such a way that each of the M×N signal electrodes is in contact with each corresponding one of the M×N connecting terminals;

(j) covering the entirety of the flat top surface of said composite ceramic structure treated in accordance with said steps (g) to (i) with an electrically conducting first metal layer, wherein the layer is provided with a top surface;

(k) forming M+1 bias electrodes, each of the bias electrodes having a vertically directional centerline, by removing the electrically conducting first metal layer covering the M boundaries and portions of the first metal layer on two opposite sides of each boundary, wherein the verically directional centerline of each bias electrode coincides with that of each block, each bias electrode partially covers each corresponding block and each bias electrode overlaps two horizontally neighboring signal electrodes placed on the flat bottom surface of said composite ceramic structure when projected thereto;

(l) covering the entirety of the flat top surface of said composite ceramic structure treated in accordance with said steps (g) to (h) with a second metal layer;

(m) patterning the second metal layer in such a way that each of the M+1 bias electrodes and the M boundaries are covered with the second metal layer, leaving the portions of the two opposite sides of each boundary uncovered;

(n) providing a platform with a top surface by covering with an epoxy the entirety of the flat top surface of said composite ceramic structure treated in accordance with said steps (g) to (m);

(o) patterning the platform into an array of M×N hinges having a top surface using a photolithography method;

(p) removing the second metal layer covering the M+1 bias electrodes;

(q) providing a supporting layer having a flat top surface on the top surface of each of the M×N hinges;

(r) forming a mirror layer on the flat top surface of each supporting layer by sputtering thereon with a light reflecting material; and (s) completing electrical connections to thereby form said array of M×N electrodisplacive actuated mirrors.

13. The method of claim 12, wherein said first and second ceramic wafers are made of a piezoelectric material.

14. The method of claim 13, wherein said first and second ceramic wafers are poled prior to said step (b) described in claim 13.

15. The method of claim 12, wherein the array of M×N signal electrodes is formed by first sputtering the flat bottom surface of said composite ceramic structure with an electrically conductive metal and then obtaining the required electrode pattern using a photolithography method.

16. The method of claim 12, wherein said composite ceramic structure is mounted on the active matrix using an electrically conductive adhesive.

17. The method of claim 12, wherein the electrically conducting metal layer is formed on the flat top surface of said composite ceramic structure by covering thereon with an electrically conductive metal.

18. The method of claim 17, wherein the M+1 bias electrodes are obtained by patterning the electrically conducting metal layer using a photolithography method.

19. The method of claim 12, wherein the second metal layer is patterned into the desired pattern using a photolithography method.

20. The method of claim 12, wherein the platform is made of aluminum or silver.

21. The method of claim 12, wherein the second metal layer covering the M+1 bias electrodes is removed using an etching method.

22. The method of claim 12, wherein the supporting layer is made of a nitride.

* * * * *